(12) United States Patent  (10) Patent No.: US 8,510,416 B2
Johan et al.  (45) Date of Patent: Aug. 13, 2013

(54) COMMUNICATION LINKS

(75) Inventors: Ron Johan, Bondi-Junction (AU); James Barlow, Naremburn (AU)

(73) Assignee: UHS Systems Pty Limited, New South Wales (AU)

( * ) Notice: Subject to any disclaimer, the term of this patent is extended or adjusted under 35 U.S.C. 154(b) by 463 days.

(21) Appl. No.: 12/740,437

(22) PCT Filed: Sep. 9, 2008

(86) PCT No.: PCT/AU2008/001336
§ 371 (c)(1),
(2), (4) Date: Oct. 15, 2010

(87) PCT Pub. No.: WO2009/055838
PCT Pub. Date: May 7, 2009

(65) Prior Publication Data
US 2011/0022683 A1    Jan. 27, 2011

(30) Foreign Application Priority Data
Oct. 30, 2007  (AU) .................................. 2007905946

(51) Int. Cl.
*G06F 15/16* (2006.01)
(52) U.S. Cl.
USPC ........................................................ 709/219
(58) Field of Classification Search
USPC ........................................................ 709/219
See application file for complete search history.

(56) References Cited

U.S. PATENT DOCUMENTS

| 5,671,251 | A | | 9/1997 | Blackwell et al. |
| 5,696,699 | A | * | 12/1997 | Nair ........................... 455/422.1 |
| 5,745,849 | A | | 4/1998 | Britton |
| 5,754,764 | A | * | 5/1998 | Davis et al. .................... 709/200 |
| 5,802,290 | A | * | 9/1998 | Casselman ..................... 709/201 |
| 5,961,589 | A | * | 10/1999 | Hansen ......................... 709/205 |
| 6,098,143 | A | * | 8/2000 | Humpherys et al. .......... 710/260 |
| 6,243,756 | B1 | * | 6/2001 | Whitmire et al. ............. 709/232 |
| 6,434,161 | B1 | * | 8/2002 | Higbee et al. ................. 370/413 |
| 7,606,245 | B2 | * | 10/2009 | Ma et al. ....................... 370/401 |
| 7,610,349 | B1 | * | 10/2009 | Swinton et al. ............... 709/216 |
| 2004/0104784 | A1 | * | 6/2004 | Enriquez ..................... 333/24 R |
| 2007/0266173 | A1 | * | 11/2007 | Wong et al. ................... 709/238 |
| 2007/0266178 | A1 | * | 11/2007 | Wong et al. ................... 709/246 |
| 2009/0077203 | A1 | * | 3/2009 | Janik ............................. 709/219 |
| 2010/0277109 | A1 | * | 11/2010 | Crookham et al. ........... 315/363 |

FOREIGN PATENT DOCUMENTS
WO  WO 00/46765    8/2000

\* cited by examiner

*Primary Examiner* — Brian P Whipple
(74) *Attorney, Agent, or Firm* — Whitham Curtis Christofferson & Cook, PC (57) ABSTRACT

A system including a plurality of remotely configurable telephone network communication terminals (102) is adapted to communicate with a programming terminal (134) over a data network (222) by adding a remote interface means (RIM) (202) for each terminal to convert communications between the terminal to or from a format adapted for transmission over the data network, the programming terminal having a modem emulator (202) having communication and programming capabilities to interface the programming terminal with the network; by converting the programming terminal data to a network compatible format, obtaining an address for the RIM, connecting the programming terminal and the RIM via the data network, connecting the RIM and the communication terminal, transmitting the converted programming terminal data to the RIM, reconstituting the converted data to a format suitable for the communication terminal, and transmitting the reconstituted data to the communication terminal.

15 Claims, 9 Drawing Sheets

FIGURE 6
POTENTIAL NETWORK ELEMENT CONNEXIONS

| 602 | | 107 | 203 | 204 | 205 | 112 | 113 | 114 | 115 | 122 | 123 | 212 | 222 | 241 | 242 | 243 | 225 | 226 | 227 | 229 | 132 | 136 | 232 | 233 | 124 | 228 | 134 |
|---|---|---|---|---|---|---|---|---|---|---|---|---|---|---|---|---|---|---|---|---|---|---|---|---|---|---|---|
| 604 | | 1 | 2 | | | 3 | 4 | 5 | | 6 | 7 | | | | | | | | | | | | | | | | |
| 606 | 102 | X | X | X | X | | | | | | | | | | | | | | | | | | | | | | |
| | 102 | X | X | X | X | | | | | | | | | | | | | | | | | | | | | | |
| AT | 102 | X | X | X | X | X | X | | X | | X | X | X | | X | | X | X | X | | X | | | | | | |
| | 102 | X | X | X | X | X | X | | | | X | X | X | | X | | X | X | X | | X | | | | | | |
| | 102 | | | | | | | | | | | | | | | | | | | | | | | | | | |
| 608 | 102 | X | X | X | X | | | 5 | | 14 | 15 | 5 | 6 | | | | | 10 | 9 | 7 | | | | | 16 | 8 | |
| | 102 | 1 | 2 | 3 | 4 | | 12 | 13 | | | | X | X | | X | X | 11 | X | X | X | X | | X | X | X | X | X |
| | 124 | | | | | | X | X | X | | X | X | X | | X | X | | X | X | X | | X | | X | | X | X |
| CT | 124 | | | | | | | | | | | | | | | | | | | | | X | | | | | |
| | 124 | | | | | | | | | | | | | | | | | | | | | | | | | | |
| | 124 | | | | | | | | | | | | | | | | | | | | | | | | | | |
| | 124 | | | | | | | X | | | | X | X | | X | X | | X | X | X | | X | X | X | X | X | X |
| | 124 | | | | | | | | | | | | | | | | | | | | | X | X | | | | |
| PT | 134 | | | | | | X | | | | | | | | | | | | | | | | | | | | |
| | 134 | | | | | | | | | | | | | | | | | | | | | | | | | | |
| | 134 | | | | | | | | | | | | | | | | | | | | | | | | | | |
| | | | | | | | | | | | | | | | | | | | | | | | | | CT | MT | PT |

AT = Alarm Panel 102; CT = Control Room Terminal 124; MT = Management Terminal 228; PT = Programming Terminal 134; 113 = PSTN; 222 = DATA NETWORK. Grey = links; Stippled = terminals; see Figure 2 for Elements in row 602

COMMUNICATION LINKS

FIELD OF THE INVENTION

This invention relates to improvements in communications links.

In particular, the invention provides a method and arrangement for providing a data communication link.

The invention is adapted for use in legacy communication systems, and can be used, for example, to connect Public Switched Telephone Network (PSTN) communication equipment to data networks, such as IP communication networks.

The invention is applicable to communication systems generally. Our co-pending international application PCT/AU2003/000921 (WO20004012434), the contents of which are incorporated herein by reference, describes a telemetry system suitable for use with an alarm communication system.

The invention will be described in the context of a packet based communication system using wired networks, such as xDSL and the like and wireless networks such as GPRS, HSDPA, CDMA-1xRTT and WiMax.

BACKGROUND OF THE INVENTION

Figure 9:
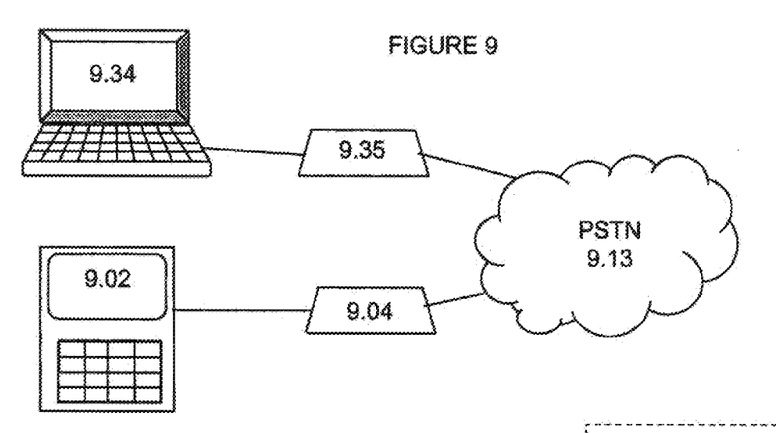
FIG. 9 illustrates an arrangement for programming an alarm panel using a programming terminal connected via the PSTN.

Premises alarm systems generally allow technicians and others to use dial up or analog data modems over the PSTN to gain remote access to the equipment in order to modify the configuration and down load new firmware. Such an arrangement is illustrated in FIG. 9 which shows programming terminal 9.34 connected to the PSTN 9.13 via modem 935, and an alarm panel 9.02 connected to the PSTN 9.13 via a second modem 9.04.

A number of problems arise when attempts are made to transmit telephony signalling via a data network.

Some non-digital signalling systems utilize "real-time" or time-dependent information to convey signalling information. For example, in telephone signalling, a pause of a known duration can be used to indicate that the following information is to be interpreted in a different manner from that in which it would normally be interpreted. Similarly, a signalling burst can be "bracketed" between pauses of defined duration. We have found that this time dependent information can be lost or corrupted in transmission across data networks such as packet-switched networks. In particular, this information can be lost in transmission across an IP network.

Recent times have seen the rapid roll out of voice over IP (VoIP) services displacing the PSTN at customer premises. As legacy alarm systems are generally incompatible with VoIP services, new customer terminal equipment has been introduced to convert the signals from the legacy alarm panels' PSTN interface to a form compatible with IP networks used to deliver the VoIP service.

The introduction of customer terminal equipment blocks the path used to remotely down load configuration data and the like into alarm systems. Therefore in order to completely replace the PSTN with IP networks, the customer terminal equipment must provide the ability to remotely (and securely) modify the configuration of the alarm system over IP or cellular networks in a similar manner to the PSTN.

Some attempts have been made to solve this problem by providing VoIP functionality in the customer terminal equipment to support a PSTN like connexion to the premises alarm system so as to provide the communications path to remotely modify the configuration over IP. This approach suffers from a number of limitations, including poor security associated with using VoIP, and unpredictable channel quality. This is due to the fact that VoIP call quality depends on available bandwidth and other factors, such as jitter and packet loss affecting the IP path between the customer premises and the remote site from which the configuration is being carried out. If the bandwidth available over the IP path is low or is available in bursts, then the quality of the communications channel is poor and will not provide a reliable connexion for the analog data modems used to provide the data communications link for remote configuration.

This specification describes an arrangement which allows the secure remote configuration of alarm systems over IP or cellular links in a manner that is far less dependent on the quality of the communications path or the available bandwidth as it only uses the bandwidth specifically required for the data download, which could range from 110 bits per Second up to 33800 bits per Second, but not exceeding 64000 bits per Second.

The invention is also applicable to other legacy systems which have similar requirements.

SUMMARY OF THE INVENTION

The invention provides a system and method for providing remote configuration access over IP and/or cellular packet networks to alarm panels that are designed to be remotely configured using an analog dial up modem over the PSTN.

The invention provides a means of remotely selecting one or more remote terminals to be programmed using a programming terminal connected via a data network and/or a PSTN.

The present invention is not limited in applicability to systems in which the remote terminal is a burglar alarm, although the high degree of flexibility offered by the invention is particularly advantageous in this context. Other uses for the invention include remote access to access control systems, building management systems, automatic vending machine and the like that support remote access via dial up analog data modems using the PSTN.

Another aspect of the invention provides a method and arrangement for transmitting time dependent information across a data network including:
providing at a first point at or outside the edge of the network a first information processing means adapted to process time-dependent information in a manner to retain the time-dependent information; and,
providing at a second point at or outside the edge of the network, a second information processing means adapted to reconstitute the time-dependent information.

The first information processing means can include a modem emulator.

The time-dependent information can be conveyed across the data network by the use of timestamps.

The invention provides a method of providing remote configuration access for a programming terminal via one or more data networks to remote terminals, such as alarm panels, that are designed to be remotely configured using a programming terminal adapted to program said remote terminal(s) via the PSTN using analog dial up, wherein a first remote interface means (RIM) or customer terminal is connected to the remote terminal, the first remote interface means being adapted to provide a bi-directional interface between a remote terminal and a data network, and a modem emulator/[second RIM] is provided to interface the programming terminal with the data network, including programming capabilities adapted for transmitting the method including the steps of:
obtaining an address for the first RIM or the remote terminal;
converting the programming terminal output signals to a format suitable for transmission via a data network;

establishing a data connexion between the programming terminal and the RIM via a data network using the address of the RIM;
establishing communication between the RIM and the remote terminal;
transmitting data from the programming terminal to the first RIM;
in the RIM, converting the data to a remote terminal format used in programming and configuring the remote terminal;
transmitting the remote terminal format information to the remote terminal.

The address of the first RIM or remote terminal can be stored in a RIM address list accessible via the data network.

The address of the RIM/remote terminal can be stored in a RIM address list stored in the programming terminal.

The programming terminal output signals include time-dependent information, the method including: time-stamping the time-dependent information.

The method can include the step of reconstituting the time-dependent information at the first RIM for transmission to the remote terminal.

The invention also provides a system for transmitting time dependent information across a data network, including:
a data network having a network protocol;
modem emulator adapted to convert serial data to the data network protocol and adapted to capture time-dependent information;
the modem emulator being connected to the edge of the network;
a remote network interface connected to the edge of the network;
data conversion means connected to the remote network interface and adapted to reconstitute the time-dependent information and the serial data.

The invention further provides a method of transmitting time dependent serial information across a data network, including: adding time stamps to at least the time-dependent information; converting the information and associated time-stamps to the network protocol; transmitting the information in network protocol format across the network to a destination terminal; and reconstituting the serial information using the time-stamps to recreate the time-dependent information.

In a further aspect, the invention provides a communications system for use with an existing panel of the type which is adapted to use a telephone line as its primary communications path, the communications system providing the existing panel with a path through a data network, the communications system including:
a data network having a network protocol;
a programming terminal associated with:
modem emulator functionality adapted to convert serial data to the data network protocol;
the programming terminal including programming software enabling the terminal to transmit serial data via the emulator and the network to a remote terminal;
the remote terminal including:
a network interface;
telephone intercept means adapted to interface with the existing panel;
the existing panel including ring detection means adapted to detect ring signal from the telephone intercept and to activate a voice frequency data modem associated with the existing panel;
a programmable data store;
and processor means adapted to enter and retrieve data from the store.

The emulator is adapted to process time-dependent information for transmission; and wherein the phone intercept is adapted to reconstitute the real time information for transmission to the existing panel The present invention is not limited in applicability to systems in which the remote terminal is a burglar alarm, although the high degree of flexibility offered by the invention is particularly advantageous in this context. Other uses for the invention include remote programming access via IP and cellular data networks to access control systems, building management systems, automatic vending machine and the like that support remote access via dial up analog data modems using the PSTN.

The communication system can include a management terminal.

The management terminal can contain a store of one or more sets of programming instructions, each adapted to preform a programming or configuration function at a remote terminal, the management terminal being responsive to a corresponding instruction from a programming terminal to transmit a selected one of the sets of programming instructions to a selected remote terminal.

A programming terminal can be adapted for use in the communication system.

The programming terminal can include modem emulation functionality or software.

The programming terminal can include a store of one or more sets of programming instructions, each adapted to preform a programming or configuration function at a remote terminal, the programming terminal being adapted to initiate a selected one of the sets of programming instructions in response to a corresponding input instruction.

The customer terminal can include VoIP functionality, the customer terminal being adapted to distinguish between alarm communications and VoIP communications from the remote terminal, and to direct alarm communications to the alarm system and to transmit VoIP communications to a VoIP network.

The customer terminal can include phone number recognition means adapted to recognize alarm communications.

BRIEF DESCRIPTION OF THE DRAWINGS

Embodiments of the invention will now be described, by way of example only, with reference to the accompanying drawings, in which.

DETAILED DESCRIPTION OF THE EMBODIMENT OR EMBODIMENTS

The invention will be described with reference to the accompanying drawings.

Figure 1:
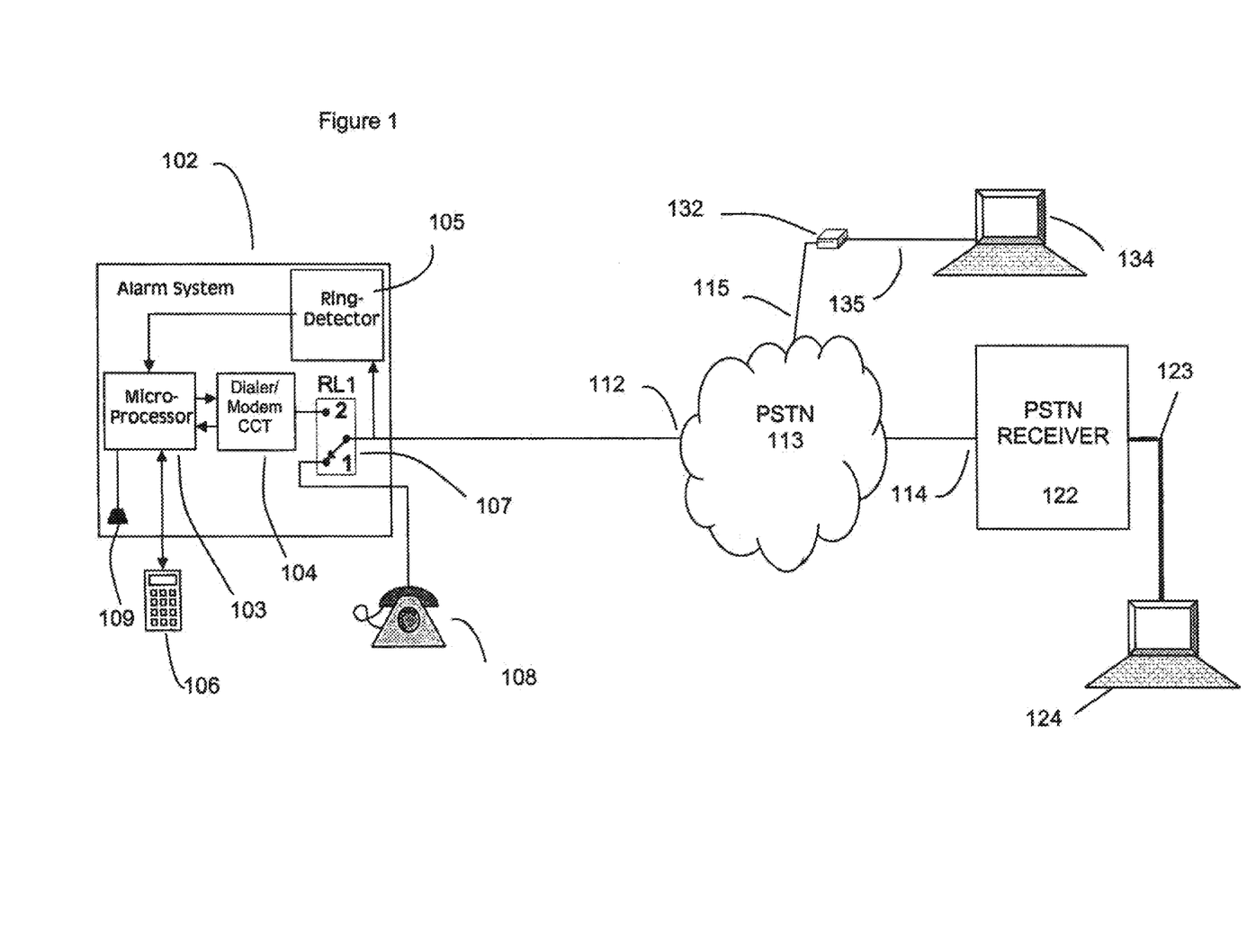
FIG. 1 illustrates an alarm communication system which shows the manner in which alarm systems are configured over the PSTN using analog data modems.

FIG. 1 illustrates an alarm system 102 which is adapted to local configuration using a serial interface and for remote configuration using an analog data modem over the PSTN. This will be described by way of providing a context for the invention.

The known Alarm System (102) comprises a Microprocessor (103) and associated memory which connects to one or more sensors (not shown), one or more Keypads (106), a serial interface (109) for local configuration via a (laptop) PC, a Dialler/Modem Circuit (104), a Relay (107) used to selectively connect the PSTN line (112) to an external Telephone set (108) or to the Dialler/Modem circuit (104) and a Ring Detector circuit (105).

Generally the alarm system (102) sends alarm messages to a control room to be displayed on a computer terminal (124). The messages are sent by the Microprocessor (103) using the Dialler/Modem Circuit (104) which is connected to the PSTN (113) via the telephone line (112) thru Relay RL1 (107). Microprocessor (103) first switches Relay RL1 (107) to position 2 then instructs Dialler/Modem Circuit (104) to dial up the phone number of the control room over the PSTN (113), which rings phone line 114. The call is answered by the PSTN Receiver (122), which terminates the call and communicates with the Dialler/Modem Circuit (104) to receive the alarm message. The message is then sent from the PSTN Receiver (122) to the computer terminal (124) to be displayed to the control room operator. When the call is completed, the Microprocessor (103) hangs up and switches Relay RL1 (107) back to position 1.

The local configuration of alarm systems that support the modification of their configuration via a local serial interface (109) using a Programming Terminal, such as a PC or laptop PC is carried out by a technician or user employing dedicated software (local and remote configuration software application), versions of which are commercially available (such as the Titan software available to configure the Tecom range of GE alarm panels sold in Australia).

To modify the configuration of the alarm system from a remote site, a technician or user employs a Programming Terminal (134) and dedicated software (remote configuration software application), versions of which are commercially available (such as the Titan software available to configure the Tecom range of GE alarm panels sold in Australia) and a dial-up analog data Modem (132) connected to the PSTN (113) via the telephone line (115). The dial-up analog data modem (132) may be internal to the Programming Terminal (134) or be connected to it via a known serial data link (135).

To initiate the configuration download, the dial-up analog data modem (132) is instructed by the Programming Terminal (134) and associated software to dial the Alarm System (102) over the PSTN (113) optionally using a special ring pattern which is described below in the case that a phone (108) or answering machine is connected to the Alarm System (102). This results in phone line (112) ringing. This condition is flagged by Ring Detector (105) to the Microprocessor (103), which switches Relay RL1 (107) to position 2 and instructs the Dialler/Modem Circuit (104) to answer the call and connect the modem to the line, thus establishing a data connexion with analog data Modem (132). Using the software on the Programming Terminal 134, the user or technician logs into the Alarm System (102) and modifies the configuration as required. When the maintenance session concludes, the Programming Terminal (134) and associated software instruct the dial-up analog data modem (132) to hang up which causes the Alarm System to hang up and causes relay 107 to return to position 1.

Other variations are possible on the above, such as:

When the Alarm System (102) receives a call, it optionally answers the call then hangs up a short while later (say 1 Second) and then calls a pre-determined number to initiate remote programming.

To initiate remote programming of the Alarm System (102), a user presses a button on the Keypad (106) which initiates a call to a pre-determined number to commence remote programming.

Figure 2:
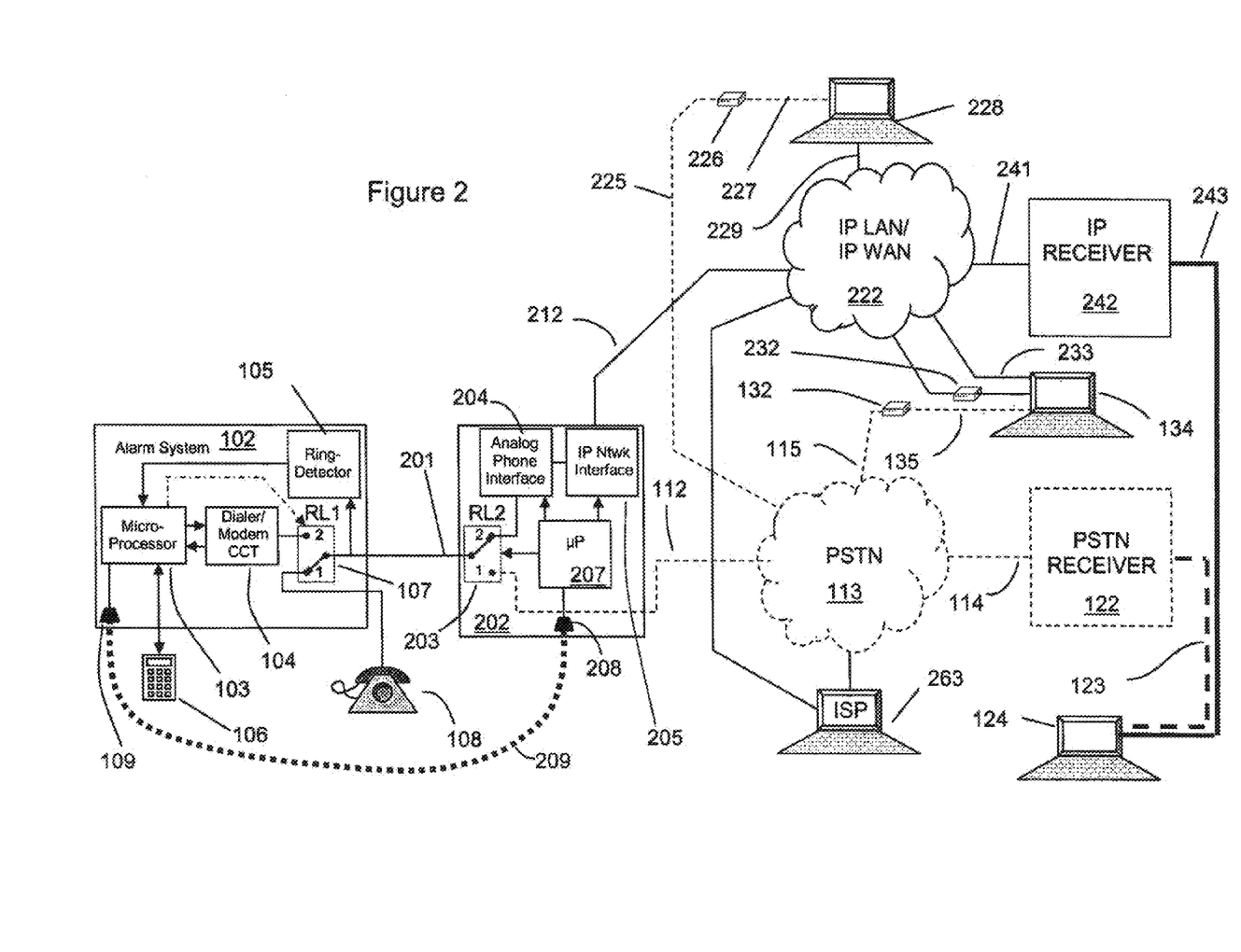
FIG. 2 illustrates a number of embodiments of the invention using a customer terminal and IP networks.

FIG. 2 is an illustrative block diagram showing elements of a network connexion between an alarm panel 102, a control room terminal 124, a programming terminal 134, and a management terminal 228 using data network 222. Optional connexions via PSTN 113 are illustrated in dashed outline.

The elements of FIG. 2 are listed in Table 1.

TABLE 1

| No. | FIGURE 2 ITEMS Item |
|---|---|
| 102 | Alarm Panel (AP) |
| 103 | AP microprocessor |
| 104 | Dialer/Modem |
| 105 | Ring Detector |
| 106 | Keypad |
| 107 | AP Relay |
| 108 | Telephone |
| 109 | AP (Local) Serial Programming Interface |
| 112 | PSTN Line |
| 113 | PSTN |
| 114 | Control Room PSTN Line |
| 115 | PT PSTN line |
| 122 | PSTN Receiver |
| 123 | Control Room Terminal Link |
| 124 | Control Room Terminal (CRT) |
| 201 | Internal Phone line |
| 202 | Customer Terminal (CT) |
| 203 | CT Relay |
| 204 | CT Analog Phone Interface |
| 205 | CT IP Network Interface |
| 207 | CT Microprocessor |
| 208 | CT Local Serial Interface |
| 209 | AP to CT Local Serial Interconnection |
| 132 | PT PSTN Modem |
| 134 | Programming Terminal (PT) |
| 212 | CT Data Link |
| 222 | Data Network (DN) |
| 224 | |
| 225 | MT PSTN Line |
| 226 | MT PSTN Modem |
| 227 | MT Modem Link |
| 228 | Management Terminal (MT) |
| 229 | MT Data Network Link |
| 232 | PT Data Network Serial Modem Emulator |
| 233 | PT Data Link |
| 242 | CRT IP Receiver |
| 243 | CRT Link |
| 263 | Internet Service Provider (ISP) |

A first embodiment of the invention provides a method and arrangement for programming a remote terminal such as alarm panel 102 via a data network 222 using one or more system terminals such as management terminal 228, control room terminal 122, and maintenance or programming terminal 134.

Control room terminal 124 is connected to data network 222 via links 243 and 241 and IP receiver 242. Management terminal 228 is connected to data network 222 via link 229. Customer gateway 202 is connected to the data network 222 via link 212. Customer Terminal 202 can be connected to the alarm panel 102 via an internal phone line 201 and/or a serial connexion 209.

In FIG. 2, a Customer Terminal or gateway 202 is adapted to connect the alarm panel 102 to a data network 222 via an analog phone interface 204 or serial interface 208 and IP network interface 205 and link 212. Data network 222 can be, for example an IP LAN or an IP WAN. From network 222, connexions can be set up to the control room terminal 124, the management terminal 228 and the programming terminal 134.

Management terminal 228 is in communication with network 222 via link 229. Programming terminal 134 can communicate with the Data network 222 via direct link 233 or serial modem emulator 232. Control room terminal 124 is in communication with the data network 222 via links 241 and 243 and IP receiver 242.

The control room terminal 124 can communicate with the management terminal 228 and with the customer gateway 202 via the data network 222. Communication between the control room terminal 124 and the gateway 202 can be adapted to be via the management terminal 228 or to bypass the management terminal 228.

While the control room terminal 124 or the management terminal 228 can be used to program the alarm panel, one or more additional programming terminals 134 can be used to carry out maintenance and programming functions.

Optionally a switch 203 is associated with the gateway 202 to provide an alternative PSTN connexion via line 112 and PSTN network 113 to the control room terminal 124, programming terminal 134, and the management terminal 228. Network 113 and its associated links are shown in dashed form to indicate their optional nature.

The customer gateway 202 is connected to the PSTN 113 via line 112. The control room terminal 124 can be connected to the PSTN via line 114 and PSTN receiver 122 which is adapted to intermediate between the terminal 124 and the PSTN 113. The programming terminal 134 is connected to the PSTN 113 via links 135 and 115 and modem 132. The management terminal 228 is connected to the PSTN via line 225 and modem 226.

Figure 6:
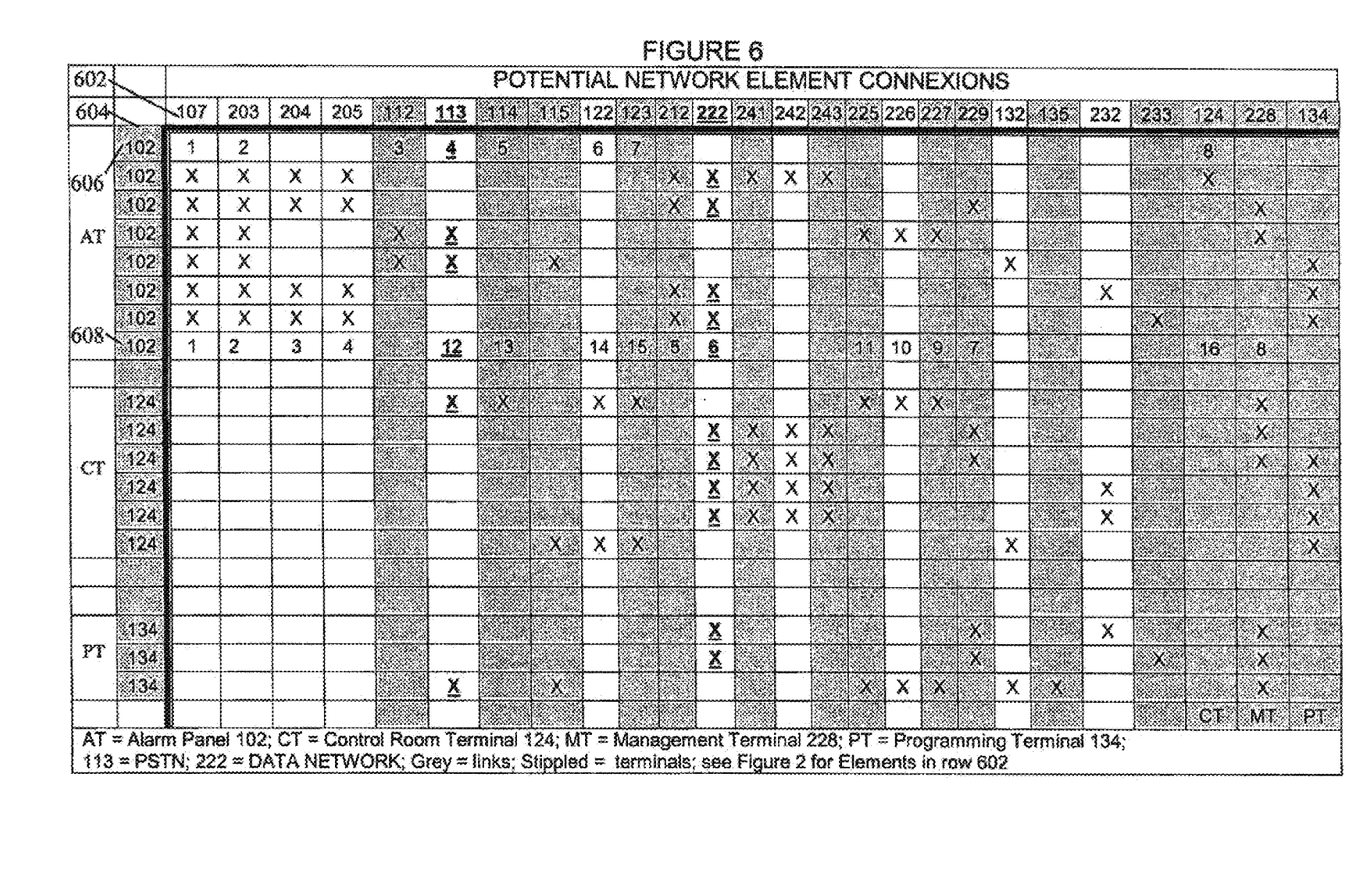
FIG. 6 is a path connexion chart.
Figure 7:
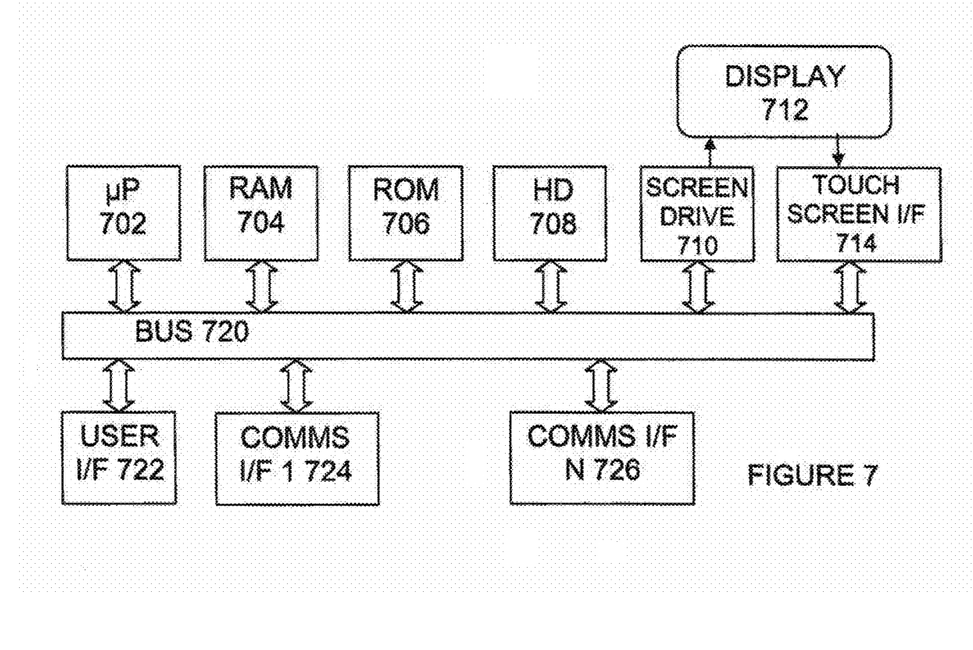
FIG. 7 is a schematic functional block diagram of a computer terminal suitable for use in the inventive system.

In the arrangement illustrated in FIG. 2, there are a number of alternative configurations for connecting the various terminals, and some of these are shown for illustrative purposes in the chart of FIG. 6. Each row of FIG. 6 indicates elements of FIG. 2 available for setting up a potential communication link between two or more terminals including the alarm panel 102, the control room terminal 124, the programming terminal 134, and the management terminal 228. In the chart of FIG. 6, the row 602 indicates the reference number of the elements of FIG. 2, and the column 604 indicates terminal reference numbers. The last three columns are also terminal references from FIG. 2.

For the sake of explanation two such connexions 606 and 608 will be described in detail using numerical references to indicate the sequence of connexions. While all connexions are capable of bi-directional communication, only one direction is indicated by the numerical sequence. A first connexion can be established between alarm panel 102 and control room terminal 124 via PSTN 113 and relay 203. This is indicated in the first row of the chart of FIG. 6 in which the numeral 1 indicates alarm panel relay, 2 indicates the customer gateway relay 203. Internal phone line 201 has been omitted to reduce the number of integers in the chart for reasons of clarity. 3 indicates the phone line 112. 4 indicates the PSTN 113. 5 indicates PSTN line 114. 6 indicates PSTN receiver 122. 7 indicates link 123, and 8 indicates control room terminal 124.

Similarly, row 608 illustrates a further connexion from alarm panel 102 to control room terminal 124 via management terminal 228, the numbers 1 to 16 indicating the network elements involved. This connexion utilizes both the data network 222 at step 6 and the PSTN 113 at step 12, and is provided to indicate the flexibility of the system in establishing paths between terminals. The system provides communication between any of the terminals if one of the links between a terminal and one networks is not functional. Thus, if any of the elements 241, 242, 243 were not functional, path 606 could be used to interconnect terminals 102, 228, and 124. Further, programming terminal 134 could also be included via either the data network 222 or the PSTN 113.

Additional paths can also be established. For example, a similar path involving the alarm panel 102, the gateway 202, the data network 222, the management terminal 228, the PSTN 113, and the programming terminal 134 can also be set up.

Other possible connexions are indicated by "X's" to reduce the visual complexity of the chart.

Further links and protocol adaptors (not shown) can be provided between the PSTN 113 and the data network 228 to provide further flexibility.

Embodiments of the invention will be described below. Other embodiments are possible, and will become apparent to the person skilled in the technology.

The Customer Terminal (202) connects to one or more IP networks (222), via one or more access legs (212) including wireline—Cable, xDSL and Fibre, as well as wireless—WiMax, GPRS, HSDPA and the like. This allows the Alarm System (102) which is connected to the Customer Terminal (202) to communicate over these networks and optionally over the PSTN as the Customer Terminal (202) may also be connected to the PSTN (113) via a telephone line (112).

The Customer Terminal (202) is described in more detail below with reference to FIG. 5.

Relay RL2 (203), if provided, is used to selectively connect the PSTN output of the Alarm System (102) to the Customer Terminal's (202) Analog Phone Interface (204) or to the PSTN line (112).

It can be used, for example to connect the Alarm System's (102) PSTN output to the Telephone Line (112) to provide a PSTN path for remote programming under operator or automatic control (124), and to provide a backup path for alarm messages from the Alarm System (102) should the Customer Terminal (202) be unable to deliver the message to the control Computer Terminal (124) via the various IP networks (222) to which it is connected.

The Analog Phone Interface (204) implements an FXS (foreign exchange subscriber) phone port which emulates the telephone line to the Alarm System (102). It generates feed Voltage (−48 Volts or as required by the DAA circuit on the Alarm System (102)) and generates dial tone when the Alarm System's (102) PSTN port transitions to the off-hook state. In addition, it includes an embedded analog data modem to communicate with the Alarm System.

The IP Network Interface (205) receives data from the Analog Phone Interface (204) and optionally encrypts it using a known data encryption algorithm such as 3DES or AES and converts it into a suitable IP format (such as UDP or TCP/IP) for transmission over the IP network (222) to the IP Receiver (242) or to the Management Terminal (228).

The invention will be explained using the following exemplary embodiments.

One exemplary embodiment uses the IP network (222) to support the remote configuration of the Alarm System (102). The user or technician uses Programming Terminal 134 to access the IP network (222) via a serial Modem Emulator (232) which is connected to the Programming Terminal (134) thru a known serial data connexion. The remote configuration software application (dedicated software), which is used when configuring the Alarm System (102) over the PSTN executes on the Programming Terminal (134) and communicates with the Modem Emulator (232) as if it were a standard serial analog modem using the known Hayes modem messaging interface. The Modem Emulator (232) sends the messages received from the Programming Terminal (134) including timestamp information where message timing needs to be maintained across the network, as one or more IP messages over the IP network (222) to the Management Terminal (228) in a secure encrypted manner (using AES256 and the like). The Management Terminal (228) translates the phone number or other unique identifier, such as Customer Terminal (202) serial number contained in the serial modem dial-up string into the IP address of the specific Customer Terminal (202) using database look up tables, or the known Dynamic DNS method whereby the phone number or unique identifier (these are entered into the Management Terminal's (228) database during the activation of the customer's service, which includes Customer Terminal (202) data), is mapped to the IP address of the Customer Terminal (202) by a Dynamic DNS process running for example on the Management Terminal (228). The Management Terminal (228) maintains the Dynamic DNS tables up to date to reflect any changes to the IP address of the Customer Terminal (202) by constantly polling the Customer Terminals (202) or by receiving heartbeat messages from the Customer Terminals (202). The Management Terminal (228) then sends a message over the IP network (222) (which may be sent over wireline or wireless) to the nominated Customer Terminal (202) instructing it to generate ring signal on its Analog Phone Interface (204). When the Alarm System (102) answers the call, the Customer Terminal (202) attempts to connect its modem (a component of the Analog Line Interface—204) to that of the Alarm System (102). If the connexion is successful, then the Customer Terminal (202) reports back over the IP network (222) to the Management Terminal (228), which in turn reports back to the Programming Terminal (134) in a manner compatible with a serial modem that allows the software application running on the Programming Terminal (134) to proceed to configure the Alarm System (102) over the IP (or cellular) path.

Should an IP connexion to the Customer Terminal (202) not be possible, or if the Alarm System (102) does not answer the call from the Customer Terminal (202), then the Programming Terminal (134) is notified by the Managements Terminal (228) via the Modem Emulator (232) using the known Hayes modem message set that the connexion is unavailable.

Examples of the message flows described above are given in FIG. 3 which illustrates the following three scenarios, although other messages can be used that achieve the same outcome. The implementation of the invention is independent of the exact messaging used.

Figure 3:
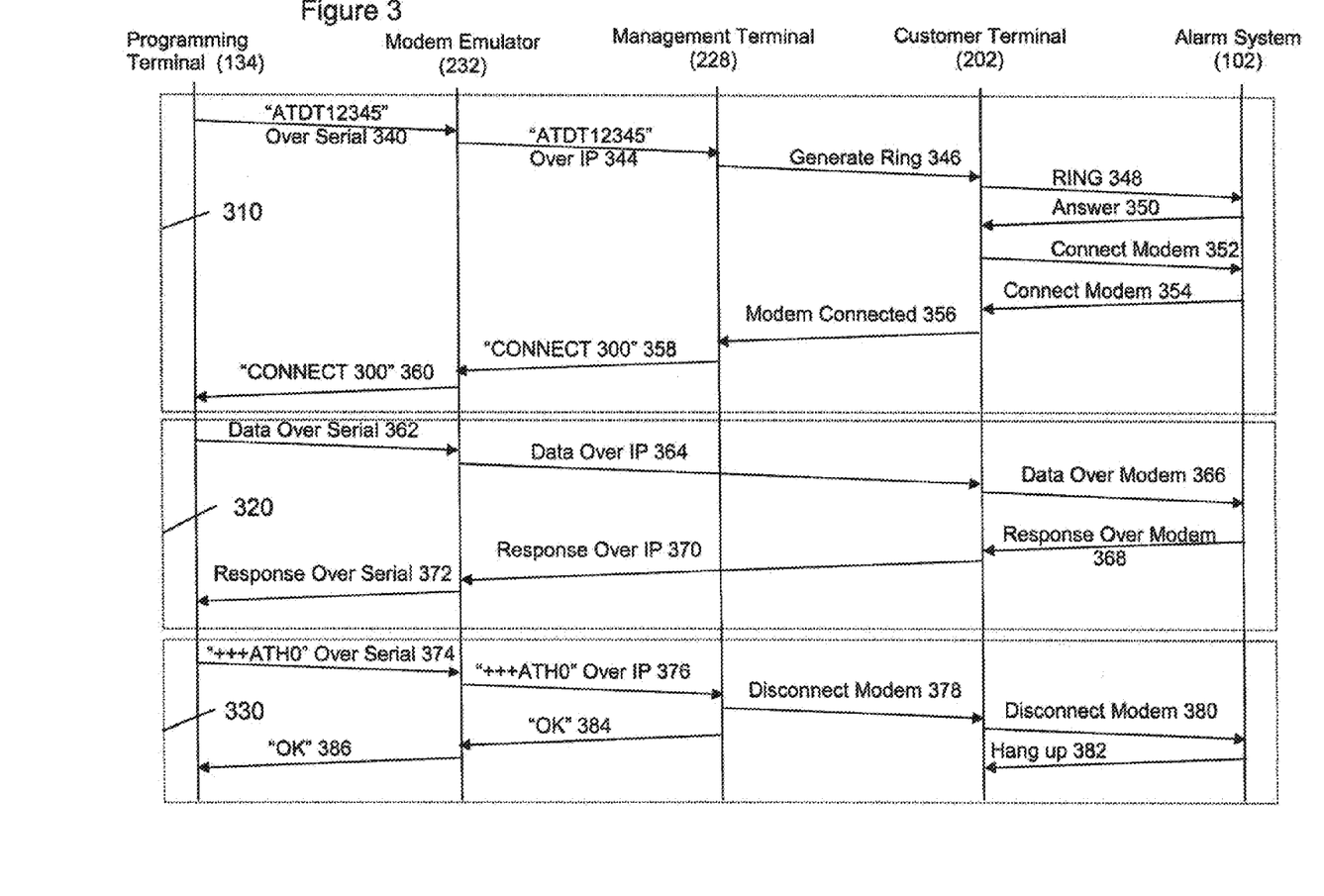
FIG. 3 describes the message flow associated with one embodiment of the invention.

Scenario 1 is the IP path setup message sequence shown by the group of messages numbered 310. At step 340, terminal 134 sends a serial (ASCII) message in the form ATDT12345 (this is an example of the use of the known Hayes modem protocol, where the command ATDTnnnn instructs the analog modem to go off hook and dial the number nnnn on its PSTN interface using the known DTMF signalling) to Modem Emulator 232. The emulator converts this message to IP format and retransmits it to Management Terminal 228 at step 344. The management terminal than sends a "generate ring" command to the Customer Terminal 202 at step 346. The customer gateway 202 generates a ring signal, which can be a special ring pattern as described below, which is transmitted to the alarm panel 102 over interconnecting line 201 at step 348. The ring detector 105 recognizes the ring signal (which may be the special ring pattern) and notifies the microprocessor 103. The alarm panel responds by switching relay 107 to position 2 and going off-hook at step 350 and this condition is detected by the analog phone interface 204 in gateway 202. The customer terminal 202 then connects its modem (a component of the analog phone interface 204) via the interconnecting line 201 to the alarm panel at step 352, and the alarm panel responds by connecting its modem (104) in step 354. It is worth noting that the exact sequence of events may vary while resulting in the same outcome. The successful connexion of the Customer Terminal's modem (204) to the Alarm System's modem (104) is notified to the Management Terminal 228 at step 356. The Management Terminal 228 then sends the known Hayes ASCII message "CONNECT 300" (or more generally CONNECT xxxx, where xxxx represents the serial connexion speed in bits/Second) or equivalent message to the programming terminal 134 via serial modem emulator 232 at steps 358 and 360. The modem emulator 232 serves to mediate between the serial data and instructions on the programming terminal 134 side of the emulator and the IP data and instructions on the network 222 side.

320 indicates Scenario 2. This is the data transfer stage in steps 362 to 372 where the data from the Programming Terminal (134) flows thru the Modem Emulator (232) directly to the Customer Terminal (202) over the IP Network (222) and then from the Customer Terminal (202) to the Alarm System (102) over analog data modem link and the responses from the Alarm System (102) to the Programming Terminal (134) flow in the opposite direction. It is worth noting that while the data is shown to bypass the Management Terminal (228), in an alternative embodiment of the invention all the messages between the Programming Terminal (134) and the Customer Terminal (202) are routed via the Management Terminal 228. In some cases there can be advantages in having the data go thru the Management Terminal (228). For example, accessing the Customer Terminal (202) via the Management Terminal (228) hides the Customer Terminal (202) from the technician at the Programming Terminal (134) making the alarm system (102) more secure from unauthorised access via the network.

330 indicates Scenario 3 which details in steps 374 to 386 the termination of the data session from the Programming Terminal (134). The session terminates when the remote configuration software application executing on the Programming Terminal (134) issues the known Hayes escape sequence which generally comprises a predefined pause in the data transfer followed by three ASCII "+" symbols followed by a further pause in the data transfer. This is followed by the remote configuration software application issuing the hang-up command, at step 374 shown in this case by using the known Hayes "ATH0" command. This instructs the Management Terminal (228) to send the Customer Terminal (202) a message to disconnect the modem, which results in the Alarm System (102) hanging up the line and terminating the session.

Other session termination mechanisms are possible, for example, when the Alarm System (102) hangs up as a prelude to sending an alarm message, the Customer Terminal (202) notifies the Modem Emulator (232) which notifies the Programming Terminal (134) using the appropriate Hayes compatible (or another appropriate) message.

The interpretation, processing and IP encapsulation of the data from the Programming Terminal (134), including the modem commands using the known Hayes modem communication protocol is preferably implemented by the Modem Emulator (232) or equivalent software function executing on the Programming Terminal (134) (enhanced terminal server). This is because the data and the modem communication protocol use time critical character sequences which need to be reproduced at the Alarm System (102) by the Customer Terminal (202).

One such character sequence is used to switch the modem in the Customer Terminal (202) to command mode which uses the following time sensitive sequence: a pause in data transmission for a period in excess of one second followed by the sending of three consecutive '+' (plus) symbols followed by a second pause in the data transmission of at least one second.

Generally transmission across data networks, and especially wireless data networks associated with cellular phone networks are highly bursty. By processing the data at the source as it leaves the Programming Terminal (134) and prior to sending it to the Management Terminal (228) or the Customer Terminal (202) ensures that the timing information associated with the message is retained when the data is regenerated at the Customer Terminal (202).

The timing relationship between characters is maintained by for example, the timestamping of each character by the Modem Emulator (232) or equivalent software function executing on the Programming Terminal (134) (enhanced terminal server) as it is received from the Programming Terminal (134). If the inter-character gap is less than one character time, then the character is concatenated to the transmit buffer. Once the size of the buffer reaches a certain size, or the gap after the last received character exceeds the character time (time-out), the contents of the buffer are transmitted as the payload of an IP packet with a timestamp or sequence number. This allows the character sequence and timing of the message to be reconstituted at the Customer Terminal (202).

Figure 4:
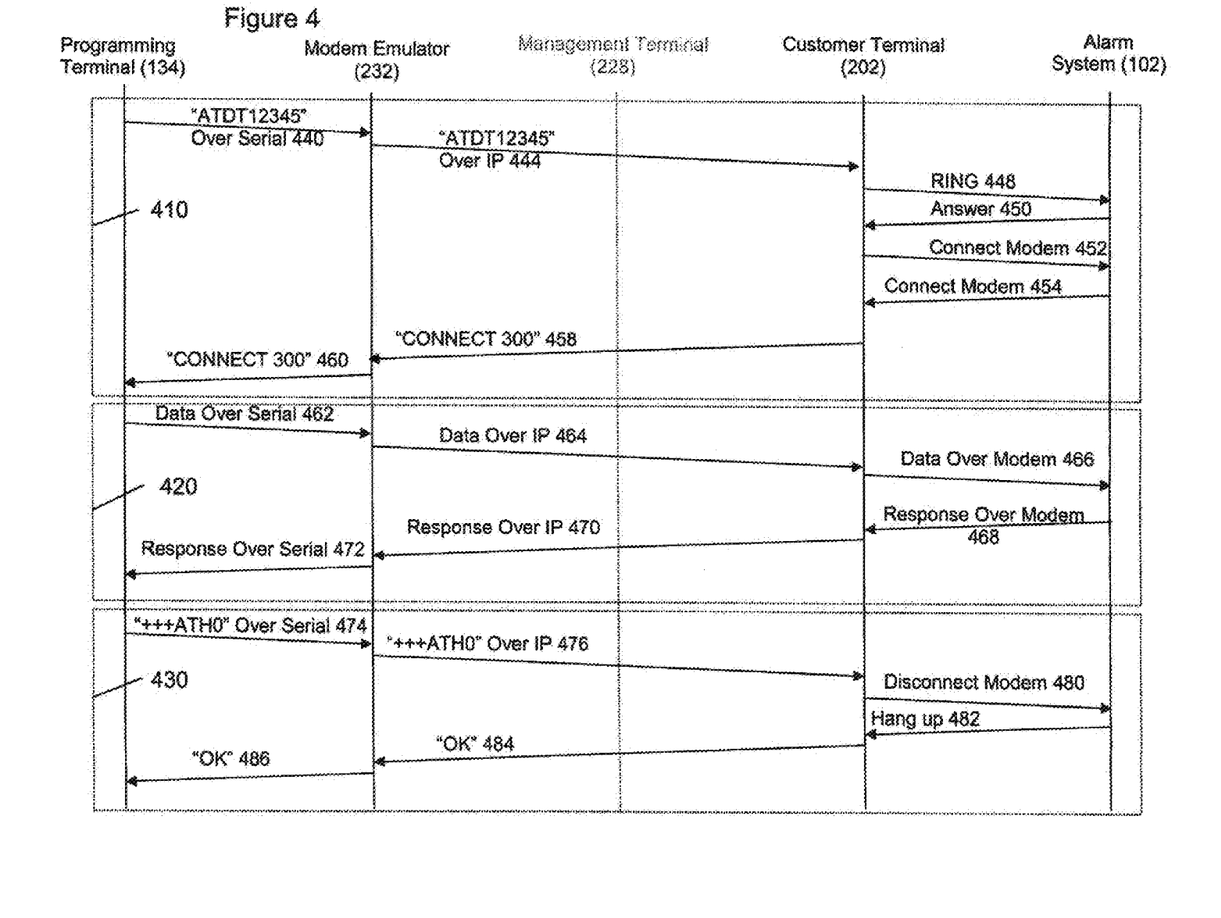
FIG. 4 describes the message flow associated with the embodiment of the invention that avoids the use of a common server or Management Terminal.

FIG. 4 shows an embodiment of the signalling which is a variation of that detailed above. In this embodiment the Programming Terminal (134) and the Customer Terminal (202) communicate directly over the IP Network (222) (or thru the Modem Emulator (232)) and not via the Management Terminal (228) or some other intermediate terminal.

Scenario 1 is the IP path setup message sequence shown by the group of messages numbered 410. At step 440, Programming Terminal 134 sends a serial (ASCII) message in the form ATDT12345 (this is an example of the use of the known Hayes modem protocol, where the command ATDTnnnn instructs the analog modem to go off hook and dial the number mum on its PSTN interface using the known DTMF signalling) to Modem Emulator 232. The Modem Emulator 232 converts this message to an equivalent message encapsulated in an IP format and retransmits it to the Customer Terminal 202 at step 444. Up on receiving this message, the customer Terminal 202 generates a ring signal, which can be a special ring pattern as described below, which is transmitted to the alarm panel 102 over interconnecting line 201 at step 448. The ring detector 105 recognizes the ring signal (which may be the special ring pattern) and notifies the microprocessor 103. The alarm panel responds by switching relay 107 to position 2 and going off-hook at step 450 and this condition is detected by the analog phone interface 204 in gateway 202. The customer terminal 202 then connects its modem (a component of the analog phone interface 204) via the interconnecting line 201 to the alarm panel at step 452, and the alarm panel responds by connecting its modem (104) in step 454. It is worth noting that the exact sequence of events may vary while resulting in the same outcome. For example, the modem connexion sequence may be different in that the Alarm System (102) may connect its modem at the same time it goes off hook. The successful connexion of the Customer Terminal's modem (204) to the Alarm System's modem (104) is notified to the Modem Emulator (232) at step 458. The Modem Emulator (232) then sends the known Hayes ASCII message "CONNECT 300" (or more generally CONNECT xxxx, where xxxx represents the serial connexion speed in bits/Second) or equivalent message to the Programming Terminal 134 at steps 460. The Modem Emulator 232 serves to mediate between the serial data and instructions on the Programming Terminal 134 side of the emulator and the IP data and instructions on the network 222 side.

420 indicates Scenario 2. This is the data transfer stage in steps 462 to 472 where the data from the Programming Terminal (134) flows thru the Modem Emulator (232) directly to the Customer Terminal (202) over the IP Network (222) and then from the Customer Terminal (202) to the Alarm System (102) over analog data modem link and the responses from the Alarm System (102) to the Programming Terminal (134) flow in the opposite direction.

430 indicates Scenario 3 which details in steps 474 to 486 the termination of the data session from the Programming Terminal (134). The session terminates when the remote configuration software application executing on the Programming Terminal (134) issues the known Hayes escape sequence which generally comprises a predefined pause in the data transfer followed by three ASCII "+" symbols followed by a further pause in the data transfer. This is followed by the remote configuration software application issuing the hang-up command, at step 474 shown in this case by using the known Hayes "ATH0" command. This instructs the Customer Terminal (202) to send a message to disconnect the modem, which results in the Alarm System (102) hanging up the line and terminating the session.

It will be clear to one skilled in the art that the signalling scheme between the elements of the invention described in FIG. 3 and FIG. 4 can be distributed differently without materially affecting the operation of the system.

This embodiment would generally be used over a private IP network where the Customer Terminal (202) is configured with a static IP address and hence is known in advance. The embodiment can also be used in conjunction with a public dynamic DNS server, however it may not be as secure as using a Management Terminal (228).

A further exemplary embodiment involves the optional relay 203 which enables an authorized remote user or technician to gain access to the alarm system via the PSTN 113. This embodiment uses change-over relay 203 to select between the PSTN line 112 and the data link 212. The PSTN (113) can be used to support the remote configuration of the Alarm System (102) by using point-to-point dial up VF modems to establish a remote data connexion. The control room operator enables the remote configuration by using Computer Terminal (124) (or equivalent) to communicate with the Management Terminal (228) via the IP Receiver (242) or other means and instructs it to command the Customer Terminal (202) via link 229, data network 222 and link 212 to set Relay RL2 (203) to position 1. This enables the remote user or technician using Programming Terminal (134) to dial up the Alarm System (102) directly over the PSTN (113) using an analog data modem (132). When the Alarm System (102) answers the call, a data session is established between Programming Terminal (134) and the Alarm System (102). When the remote configuration has been completed, the control room operator disables remote configuration by using computer terminal (124) to communicate with the Management Terminal (228) via the IP Receiver (242) or other means and instructs it to command the Customer Terminal (202) to set Relay RL2 (203) to position 2. Relay RL2 (203) can also revert to position 2 by detecting that the Alarm System (102) has un-looped the line.

As a variation on the above, the Customer Terminal (202) can be configured to automatically set Relay RL2 (203) to position 1 in response to a special ring pattern.

The special ring pattern can comprise of a timed ring burst, followed by a break of say up to 30 seconds, followed by a further ring burst.

The special ring pattern can be initiated by an instruction from the programming terminal (134) to modem 132. This eliminates the need for operator intervention via terminal 124.

A further exemplary embodiment uses the IP network (222) to support the remote configuration of the Alarm System (102). The user or technician uses Programming Terminal 134 to access the IP network (222) via a direct IP connexion (233) such as xDSL or WiMax. The remote configuration software application, which is used when configuring the Alarm System (102) over the PSTN, communicates via an enhanced terminal server software application that executes on the Programming Terminal (134). The enhanced terminal server application emulates one or more standard serial communications ports on the Programming Terminal (134), terminates the modem communication protocol, converts the data to IP packets and records the data stream and associated timing from the Programming Terminal (134) to the Alarm System (102) to be stored in the Management Terminal's (228) database. This software application takes the place of the Modem Emulator (232) described in the exemplary embodiment detailed above, and uses identical messaging (see FIG. 3 and FIG. 4). The emulation of multiple standard serial communications ports on the Programming Terminal (134) by the enhanced terminal server application, allows the user or technician to run multiple instances of the remote configuration software application on the one Programming Terminal (134) and concurrently remotely configure multiple alarm systems avoiding the need to use multiple phone lines or multiple Programming Terminals.

The Modem Emulator (232) has an associated serial identifier that can be registered with the Management Terminal (228) to provide additional security. Similarly, the enhanced terminal server software application can be supplied with a security dongle to be connected to the Programming Terminal (134) to achieve the same goal.

Another exemplary embodiment has the Programming Terminal (134) establishing a direct (point-to-point) IP connexion with the Management Terminal (228) via a PSTN dial-up line. The connexion from the Programming Terminal (134) uses a dial up modem (132) to connect thru the PSTN (113) to a dial up modem (226) at the Management Terminal (228). Once the IP connexion is established, the operation is as described in the above exemplary embodiments.

Another exemplary embodiment has the Programming Terminal (134) establishing an IP connexion with the Management Terminal (228) over the internet using a PSTN dial-up line. The connexion from the Programming Terminal (134) uses a dial up modem (132) to connect thru the PSTN (113) to an internet service provider (ISP) 263, which provides the connexion into the IP network (222). Once the IP connexion is established, the operation is as described in the exemplary embodiments described above.

The embodiments described can be applied whether the IP Network (222) is implemented over the internet or a private network. The Programming Terminal (134), the Management Terminal (228), IP Receiver (242), PSTN receiver (122) and the control room terminal 124 can be co-located or geographically distributed.

The Modem Emulator's (232) serial interface setting, including speed can be set by configuring the unit via its Ethernet interface (510) by for example, using a web browser to surf to a configuration web page implemented in the Modem Emulator (232). A further refinement can be implemented in which the Modem Emulator (232) is adapted to auto discover the Programming Terminal's (134) serial interface speed using known auto baud rate detection techniques.

Generally the serial link speed is determined by the Alarm System (102). A major advantage of this invention is that the connexion between the Programming Terminal (134) and the Modem Emulator (232) can be set to any speed being the same or greater than the speed at which the Alarm System (102) communicates with the Customer Terminal (202) and use the Customer Terminal (202) to buffer the data being down loaded to the Alarm System (102).

Alarm Systems (102) generally use dial up modems that operate at low speeds for remote configuration (generally below 9600 bits/Second) which do not take advantage of modern high speed communications systems. The following embodiment illustrates the way the invention allows higher data rates to be used to remotely configure alarm panels that support a local serial configuration interface (109).

Alarm Systems (102) that support local configuration via a serial data interface (109) can be remotely configured using this invention by connecting their local serial configuration port (109) via a serial cable (209) to the serial interface (208) on the Customer Terminal (202). This provides a direct virtual data connexion from the Programming Terminal (134) thru to the Customer Terminal (202) and then to the Alarm System (102) via a number of possible routes thru the network as illustrated by FIG. 6, some are point-to-point and some via the Management Terminal (228).

Figure 8:
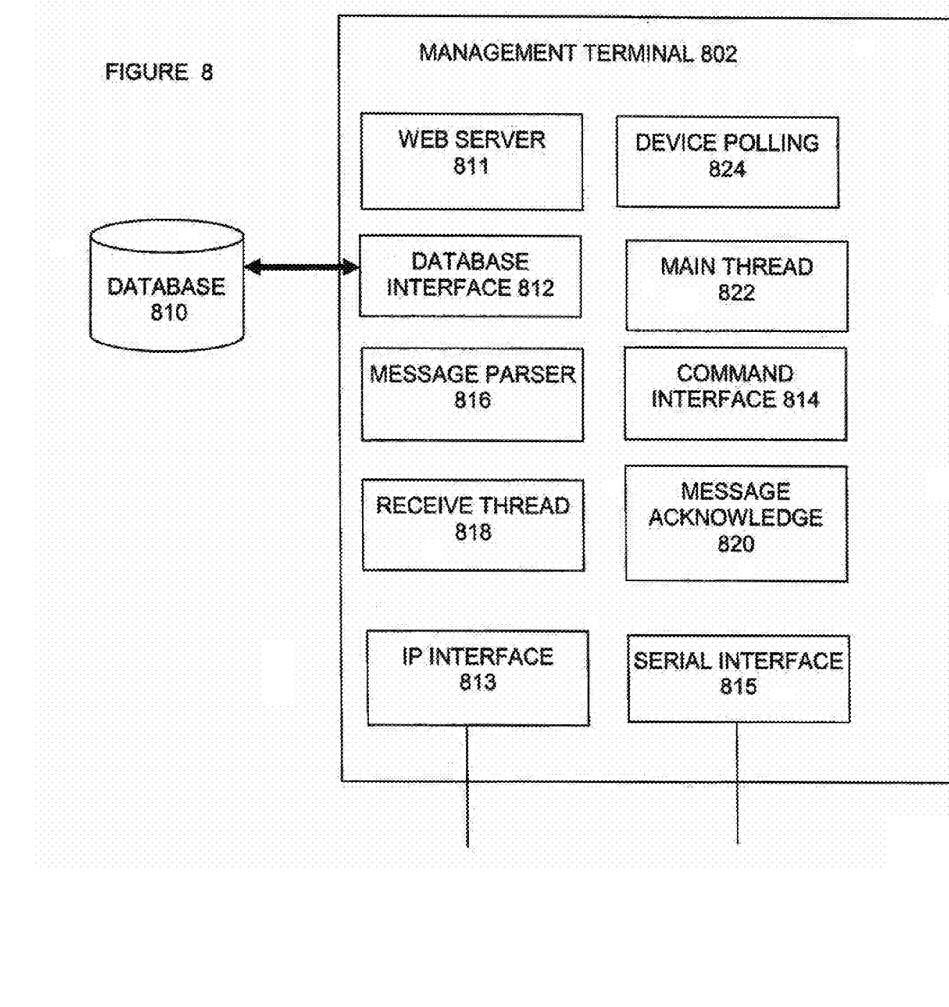
FIG. 8 is a schematic functional block diagram of the Management Terminal and database used to store and download configurations via standard user interfaces such as web browsers.

As this embodiment simulates a direct local connexion between the Programming Terminal (134) and the Alarm System (102), the establishment of the virtual path between the Programming Terminal (134) and the Customer Terminal (202) associated with the Alarm System (102) is carried out by several means, including:

Direct programming of the destination (IP) address of the Customer Terminal (202) into the Modem Emulator (232) or into the enhanced terminal server application executing on the Programming Terminal (134) via the Programming Terminal (134) or other means, such as remote configuration;

The implementation of a web server application on the Management Terminal (228) that identifies the Customer Terminal (202) based on selection criteria (such as unique customer account number or site ID) entered by the user via a web browser from say the Programming Terminal (134) or other. The web server application provides data that can be used to either manually or automatically configure the destination (IP) address of the Customer Terminal (202) into the Modem Emulator (232) or into the enhanced terminal server application executing on the Programming Terminal (134);

A major benefit of this invention is that the Management Terminal (228) can store a number of Alarm System (102) configurations in its database (810), allowing end customers or technicians to access the Management Terminal (228) directly or by dialling into the data network (222) using known web browser software executing on a standard computer such as the Programming Terminal (134) connected to the data network (222) instead of using a dedicated remote configuration software application running on a Programming Terminal (134). By accessing the Management Terminal (228) using a web browser running on a Programming Terminal (134), end customers or technicians can select the Alarm System (102) or other legacy terminal device and down load the configuration data file directly, avoiding the need to maintain an active session per Alarm System (102) on the Programming Terminal (134), as each web browser window communicates with an Alarm System (102). This also provides a centralised configuration database which is easier to maintain and backup.

The Alarm System (102) configurations are captured using a software application which forms part of the Modem Emulator (232) or enhanced terminal server software executing on the Programming Terminal (134) which records a data download session from the Programming Terminal (134) to the Alarm System (102) and stores the data stream and associated timing in the Management Terminal's database (810) to be replayed directly (and with the same timing characteristics) at a later stage from the management terminal (228).

The embodiment shown in FIG. 2 delivers an added benefit in that it allows the one Customer Terminal (202) to be used to communicate both alarm traffic using secure IP messaging and telephone traffic using the known VoIP standards.

As can be seen in FIG. 2, when Relay RL1 (107) is in position 1 and relay 204 is in position 2, the phone (108) is connected to the Analog Phone Interface (204) on the Customer Terminal (202). This allows the Customer Terminal (202) to carry voice calls on to the IP network (222). The Customer Terminal (202) uses the number dialled to determine whether the call represents an alarm message by for example, comparing the number dialled against a lookup table associated with the Network Processor (512). The alarm message is encrypted by the Network Processor (512) and sent to the IP Receiver (242). In the event of a voice call, the call is encapsulated into IP by the Network Processor (512) using the known VoIP standards and routed to a known VoIP gateway with the associated SIP or other signalling.

Figure 5:
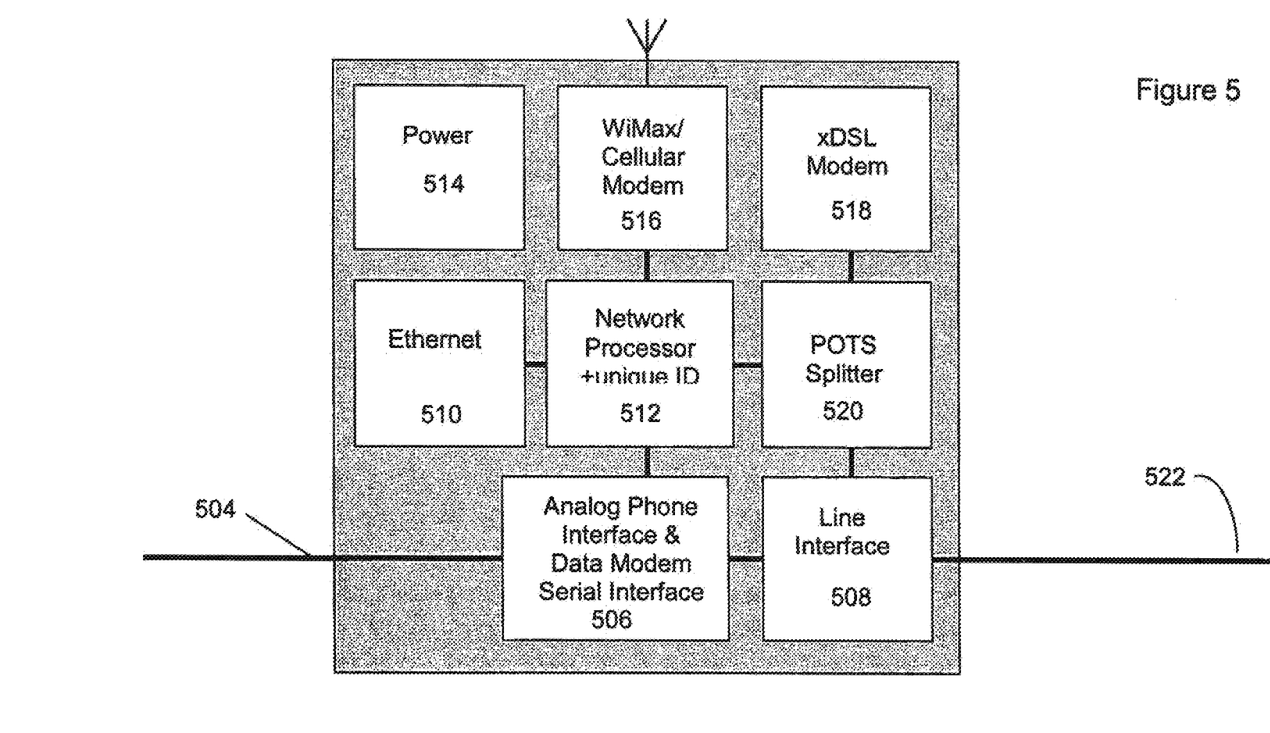
FIG. 5 is a block schematic illustration of an interface unit which can be used as a Customer Terminal or Modem Emulator adapted to be configured in accordance with an embodiment of the invention.

FIG. 5 details the block diagram of the Customer Terminal (Item 202 in FIG. 2), which also operates as a Modem Emulator (232) when connected via its serial interface to the Programming Terminal (134). The PSTN emulation port 504 is a two-wire port providing a known FXS connexion to the Alarm System (FIG. 1 Item 102) and to an analog telephone (see FIG. 1 Item 108). The generation and interpretation of the PSTN emulation signals are implemented by the Analog Phone Interface 506, which generates the feed voltage, dial tone, ring pattern, special ring pattern, busy tone, CLI signals and the like and also interprets the phone number dialled by the Alarm System (102) or telephone (108) using the known DTMF dialling codes, hook flash and other signals emanating from the Alarm System (FIG. 1 Item 102) or phone (108). In addition, the interface is equipped with an analog data modem able to originate and terminate data calls and a serial data interface to alarm panels (102) (using serial cable 209), PCs and the like.

The Customer Terminal interface 508 to the PSTN allows the unit to:
Provide a fall back path to the PSTN should the unit fail, or in the event that both the IP and cellular paths fail;
Interface to the telephone line for the purpose of terminating the ADSL signal from the central office;
Customer Gateway Ethernet interface 510 has a dual role. When the Customer Terminal is used as the customer's broadband gateway, the Ethernet port (510) is used to connect the customer's computers and other devices to the broadband network. Should the customer use alternative means to connect to the broadband network, then the Ethernet port (510) is used to connect the Customer Terminal to the broadband network to facilitate communications over the WAN, including VoIP calls.

POTS Splitter 520 is provided to remove the ADSL (or VDSL2) tones from the telephone line when the Customer Terminal is used as an ADSL (or VDSL2) modem.

ADSL (or VDSL2) modem 518 terminates the ADSL (or VDSL2) signals from the Central Office when the Customer Terminal is used as an ADSL (or VDSL2) modem.

Cellular or WiMax modem 516 is used to communicate over wireless IP networks including GPRS, HSDPA/HSUPA and WiMax.

Network Processor 512 is a microprocessor complete with CPU, memory and a unique ID device, which may be integrated on to the processor chip. It implements a number of functions, including but not limited to:
The signalling associated with VoIP call set up and completion over the broadband and cellular IP networks;
The encoding and decoding associated with VoIP calls;
Implementation of the commands sent by the Management Terminal (228);
Monitoring and reporting of cellular signal strength;
Support local and remote customer service configuration and remote software download;
Encryption and transmission of alarm messages;
Phone number decoding and interpretation.

The unique ID can be used by the Management Terminal (228) to uniquely identify the Customer Terminal to prevent spoofing. When the Customer Terminal device is used as a Modem Emulator (232), the unique ID is used to register it with the Management Terminal (228) to provided increased security.

Customer Terminal power supply 514 is generally powered from the AC mains using either a wall mounted transformer (plug-pack) or an internal supply. An optional backup battery such as a sealed Lead Acid battery may be used which is charged from the mains supply via power supply 514 can be used to ensure that the system continues to operate in the event of a mains failure.

The above description describes an invention that supports the down load of configuration data to an Alarm System via an IP network. Optionally, provision is made to carry out the down load over the PSTN. It can be seen that the invention also supports the down load of configuration data to an Alarm System via an IP network, where the interface to the Alarm System is via a serial or other data port.

FIG. 8 details the functional diagram of the Management Terminal. The Management Terminal (228) interfaces to the data network (222) and hence to the Programming Terminal (134) via the IP interface (813). Received messages are processed by the Management Terminal (228). Any commands to the Customer Terminal (202), such as send ring etc. are handled by the Command Interface (814).

Copies of down loaded files and their associated timing characteristics can be stored in the Management Terminal's database (810), and can be accessed via a web browser or other means by using an Alarm System (102) identifier, such as customer account number.

Direct access to the Management Terminal (228) via the PSTN is thru the serial interface (815) which connects to a standard VF modem (as shown in FIG. 2).

The Web Server (811) provides access via the IP network (222) to data files containing Alarm System (102) configuration information. These are held in the Management Terminal's database (810). Users or technicians can access the data using a web browser that connects to the Web Server (811) and choose to download the data into one or more nominated Alarm Systems (102) or modify the data prior to downloading. These files form macro commands to the Alarm System, allowing complex operations such as multi-zone arming and disarming to be done simply and securely from a web browser.

Figure 10:
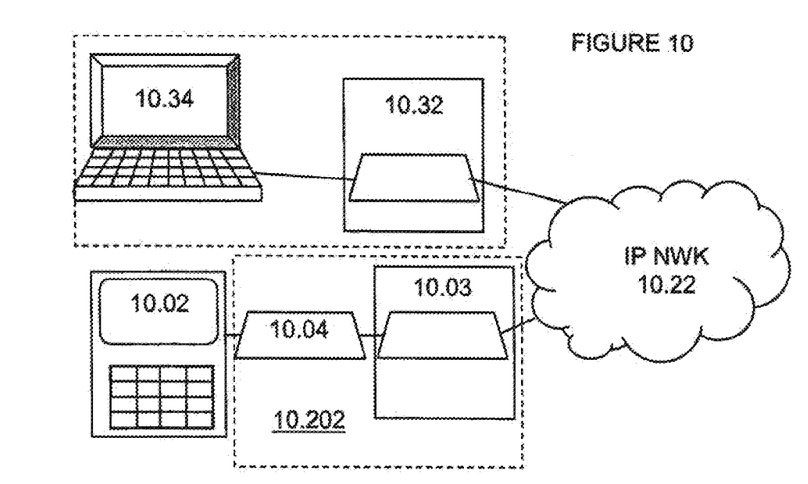
FIG. 10 illustrates an arrangement for programming an alarm panel using a programming terminal connected via an IP network

FIG. 10 is a schematic illustration of a programming terminal 10.34 with associated modem emulation functionality 10.32 connected to an IP network 10.22. The modem emulation functionality can be provided by software within the terminal 10.14, or it can be provided by separate equipment. At the alarm panel end, the customer terminal 10.202 can provide the modem emulation function 10.03 and the modem functionality 10.04 to connect the alarm panel 10.02 to the data network.

The invention claimed is:

1. A method of providing remote configuration access for a programming terminal via a data network having a network protocol, to one or more remote terminals,
the programming terminal being adapted to program said one or more remote terminals via switched telephone network (PSTN) using an analog dial up modem,
said one or more remote terminals being designed to be remotely configured, wherein a first remote interface means (RIM) is connected to a corresponding one of the one or more remote terminals,
the first RIM being adapted to provide a bi-directional interface between the corresponding remote terminal and the data network,
wherein a modem emulator function is provided to interface the programming terminal with the data network,
the modem emulator function including programming capabilities adapted for transmitting data via the data network,
the method including the steps of:
obtaining an address for the first RIM or the corresponding remote terminal;
converting output signals from the programming terminal to a format suitable for transmission via the data network;
establishing a data connection between the programming terminal and the first RIM via the data network using the address of the first RIM or corresponding remote terminal;
establishing communication between the first RIM and the corresponding remote terminal;
initiating the transmission of said data to the first RIM;
in the first RIM, converting the data to a remote terminal format used in programming or configuring the corresponding remote terminal; and
transmitting the data in the remote terminal format to the corresponding remote terminal.

2. A method as claimed in claim 1, wherein the address of the first RIM is stored in a RIM address list accessible via the data network.

3. A method as claimed in claim 2 wherein the RIM address list is stored in the programming terminal.

4. A method as claimed in claim 1, wherein the output signals from the programming terminal include time-dependent information, the method further including: time-stamping the time-dependent information.

5. A method as claimed in claim 4, further comprising the step of reconstituting the time-dependent information at the first RIM for transmission to the corresponding remote terminal.

6. A method as claimed in claim 4, wherein the data network has a corresponding network protocol, and wherein the method further comprises:
adding time-stamps to the time-dependent information;
converting the data, the time-dependent information and associated time-stamps to a format suitable for transmission via the data network;
transmitting the data, time-dependent information and time-stamp information in said format suitable for transmission via the data network across the data network to a destination terminal; and
reconstituting serial information using the time-stamps to reconstitute the time-dependent information.

7. A communications system including a programming terminal and one or more remote terminals for use with an existing alarm panel of a type which is adapted to use a telephone line as a primary communications path, wherein the communications system provides the existing alarm panel with an ability to transmit signals via a path through a data network having a network protocol, comprising:
a programming terminal associated with a modem emulator functionality adapted to convert serial data to a format suitable for transmission via the data network;
the programming terminal including programming software, enabling the programming terminal, using the modem emulator functionality, to transmit serial data via the data network to a remote terminal of said one or more remote terminals;
the remote terminal of said one or more remote terminals including:
a network interface;
telephone intercept means adapted to interface with the existing alarm panel, the existing alarm panel including ring detection means adapted to detect ringing signals from the telephone intercept means and to activate a voice frequency (vf) data modem associated with the existing alarm panel;
a programmable data store; and
processor means adapted to enter and retrieve data from the programmable data store.

8. A communications system as claimed in claim 7, wherein the modem emulator functionality is adapted to process time-dependent information for transmission; and wherein the telephone intercept means is adapted to reconstitute the time-dependent information for transmission to the existing alarm panel.

9. A communication system as claimed in claim 7, further comprising a management terminal adapted to communicate via the data network.

10. A communication system as claimed in claim 9, wherein the management terminal contains a store of one or more sets of programming instructions, each set of programming instructions being adapted to perform a programming or configuration function at one of said one or more remote terminals, the management terminal being responsive to a corresponding instruction from the programming terminal to transmit a selected one of the sets of programming instructions to a selected remote terminal.

11. A programming terminal for use in
a communication system including the programming terminal and one or more remote terminals for use with an existing alarm panel of a type which is adapted to use a telephone line as a primary communications path, wherein the communications system provides the existing alarm panel with an ability to transmit signals via a path through a data network having a network protocol, comprising:
a programming terminal associated with a modem emulator functionality adapted to convert serial data to a format suitable for transmission via the data network;
the programming terminal including programming software enabling the programming terminal to transmit serial data via the modem emulator and the data network to a remote terminal of said one or more remote terminals;
the remote terminal of said one or more remote terminals including:
a network interface;
telephone intercept means adapted to interface with the existing alarm panel, existing alarm panel including ring detection means adapted to detect ringing signals from the telephone intercept means and to activate a voice frequency (vf) data modem associated with the existing alarm panel;
a programmable data store; and
processor means adapted to enter and retrieve data from the programmable data store,
the programming terminal comprising:
a store of one or more sets of programming instructions, each of said programming instructions adapted to perform a programming or configuration function at a remote terminal of said one or more remote terminals, the programming terminal being adapted to initiate a selected one of the sets of programming instructions in response to a corresponding input instruction.

12. A programming terminal adapted as recited in claim 11, further comprising modem emulation software.

13. A customer terminal adapted for use in
a communication system including the programming terminal and one or more remote terminals for use with an existing alarm panel of a type which is adapted to use a telephone line as a primary communications path, wherein the communications system provides the existing alarm panel with an ability to transmit signals via a path through a data network having a network protocol, comprising:
a programming terminal associated with a modem emulator functionality adapted to convert serial data to a format suitable for transmission via the data network;
the programming terminal including programming software enabling the programming terminal to transmit serial data via the modem emulator and the data network to a remote terminal of said one or more remote terminals;
the remote terminal of said one or more remote terminals including:
a network interface;
telephone intercept means adapted to interface with the existing alarm panel, the existing alarm panel including ring detection means adapted to detect ringing signals from the telephone intercept means and to activate a voice frequency (vf) data modem associated with the existing alarm panel;
a programmable data store; and
processor means adapted to enter and retrieve data from the programmable data store,
the customer terminal comprising:
voice over internet protocol (VoIP) functionality, the customer terminal being adapted to distinguish between alarm communications and VoIP communications from a remote terminal, and to direct alarm communications to an alarm system and to transmit VoIP communications to a VoIP network.

14. A customer terminal as claimed in claim 13 further comprising phone number recognition means adapted to recognize alarm communications.

15. A method of providing remote configuration access for a programming terminal via one or more data networks to one or more remote terminals,
the programming terminal being adapted to program said one or more remote terminals via a public switched telephone network (PSTN) using an analog dial up modem,
each of said one or more remote terminals being designed to be remotely configured via the PSTN,
wherein a first remote interface means is connected to a corresponding one of the one or more remote terminals,
the first remote interface means being adapted to provide a bi-directional interface between the corresponding remote terminal and a data network,
wherein a modem emulator means is provided to interface the programming terminal with the data network, the modem emulator means including programming capabilities adapted for transmitting information via the data network,
the method including the steps of:
providing one or more sets of instructions and data;
selecting one of the sets of instructions and data;
converting the selected set of instructions and data to a format adapted for transmission via the data network, and
transmitting the selected set of instructions and data to one of said one or more remote terminals via the data network.

* * * * *